Jan. 2, 1934.   E. A. JONES   1,942,103
HEATER CASING
Original Filed Feb. 5, 1931   2 Sheets-Sheet 1
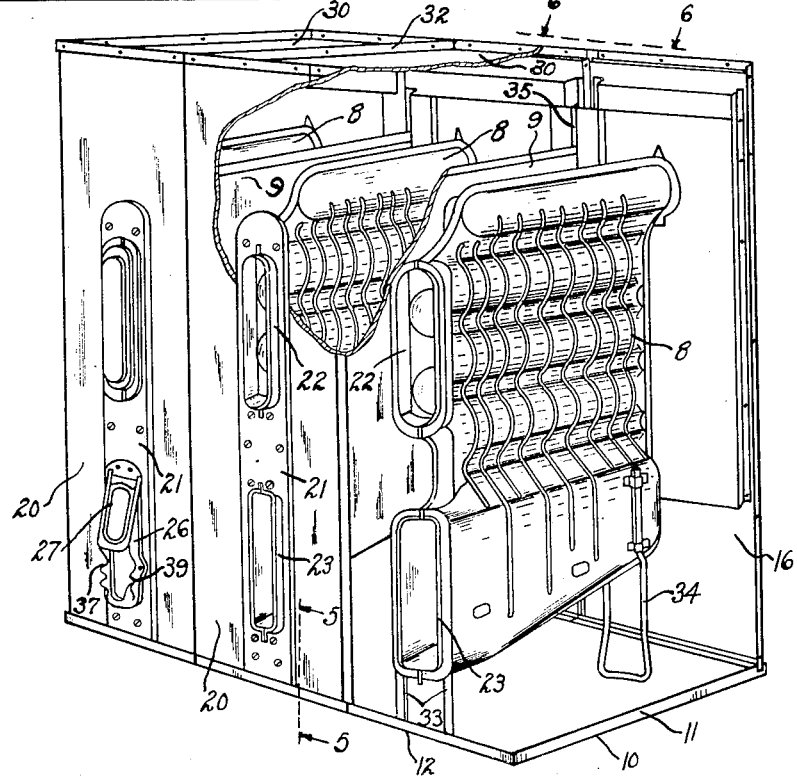
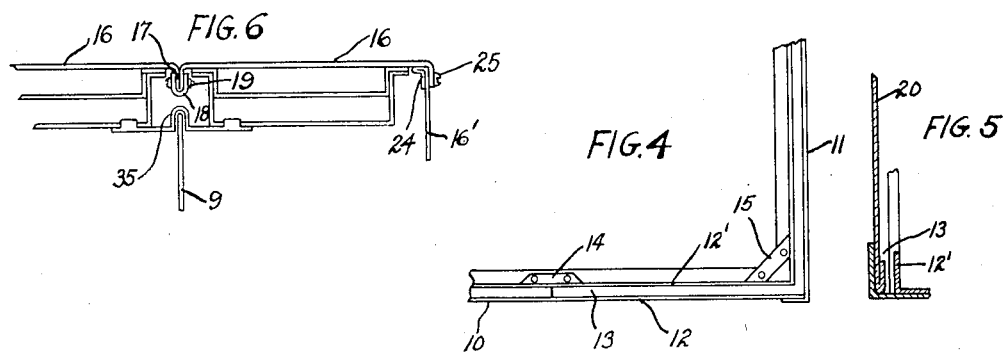
INVENTOR.
Edwin A. Jones,
BY Morsell + Morsell
ATTORNEYS.

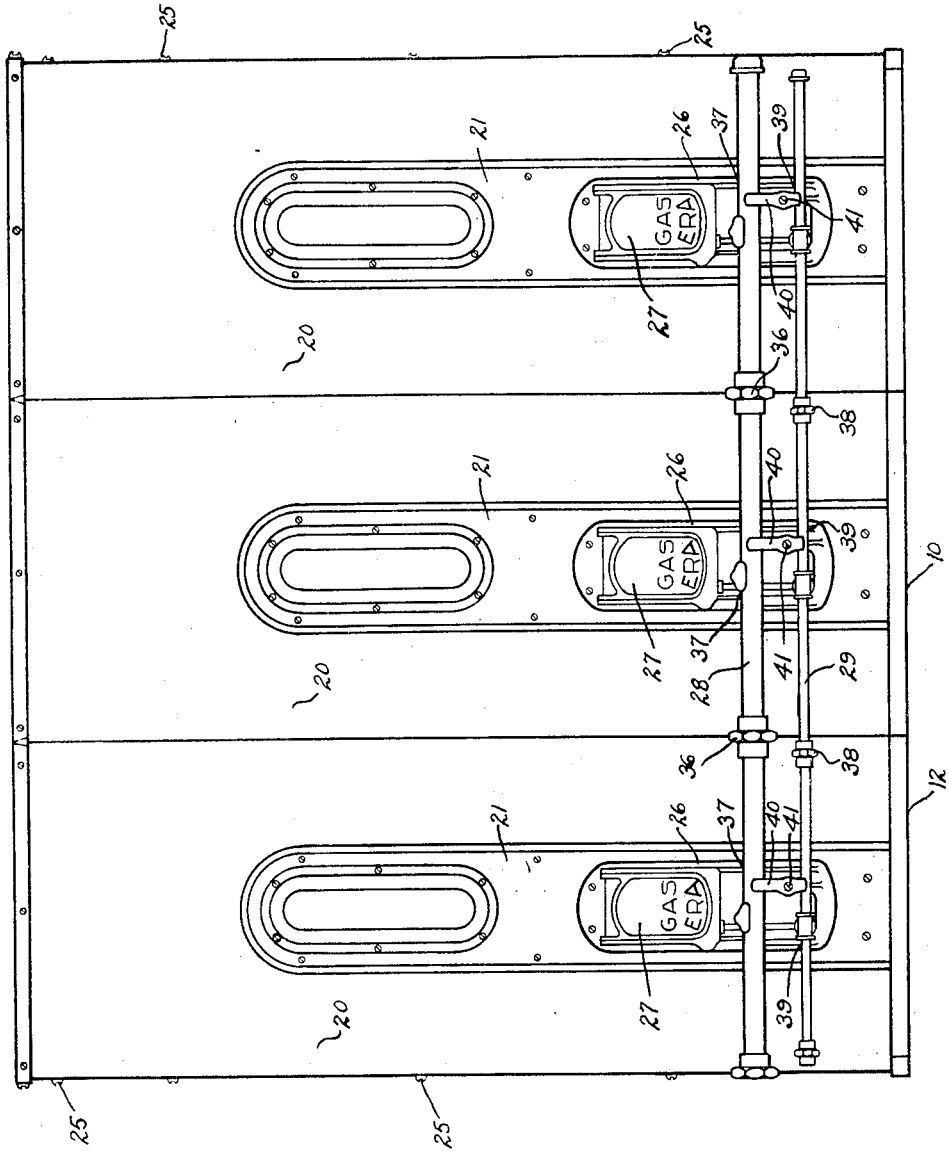

Patented Jan. 2, 1934

1,942,103

UNITED STATES PATENT OFFICE 1,942,103

HEATER CASING

Edwin A. Jones, Milwaukee, Wis., assignor to L. J. Mueller Furnace Company, Milwaukee, Wis., a corporation of Wisconsin Original application February 5, 1931, Serial No. 513,470. Divided and this application September 28, 1931. Serial No. 565,418

6 Claims. (Cl. 126—114)

This invention relates to improvements in heater casings, and more particularly to a sectional furnace casing.

It is one of the objects of the present invention to provide an outer enclosing casing for one or a plural number of heater sections, the casing being of sectional, interchangeable construction whereby standard casing parts are employed to assemble a casing of any desired length for the accommodation of any required number of heater units.

A further object of the invention is to provide a heater casing formed of sheet metal sections which are easily connected together and assembled to provide a complete casing of a required length, the construction of the casing sections minimizing assembly costs and providing a simple, durable and relatively inexpensive structure.

A further object of the invention is to provide a sectional heater casing wherein adjacent portions of sections are formed with easily engageable connections.

A further object of the invention is to provide a heater casing which is strong and durable, is of very simple and inexpensive construction, and is well adapted for the purposes described.

This application constitutes a division of my co-pending application Serial Number 513,470, filed February 5th, 1931.

With the above and other objects in view the invention consists of the improved heater casing, and its parts and combinations as set forth in the claims, and all equivalents thereof.

In the accompanying drawings in which the same reference characters indicate the same parts in all of the views:

Fig. 1 is a perspective view of a three unit gas furnace enclosed by the improved sectional casing, portions of the casing being broken away;

Fig. 2 is an enlarged front view of the casing in its assembled, enclosing condition;

Fig. 3 is a perspective view of the top of the casing with part broken away and in section to show details of construction;

Fig. 4 is a fragmentary plan view of the base ring portion of the casing;

Fig. 5 is an enlarged, fragmentary, detail sectional view taken on line 5—5 of Fig. 1; and Fig. 6 is a fragmentary plan view of a rear portion of the casing and a radiation shield or partition showing the engagement of the latter with casing portions, said view being indicated by the line 6—6 of Fig. 1.

Referring now more particularly to the drawings it will be seen from Fig. 1 that the improved casing is illustrated as enclosing a gas furnace composed of three adjacent units 8 separated from one another by vertical radiation shields or partitions 9 mounted within the casing. Certain types of heating apparatuses, such as gas furnaces, include one or a plural number of heating units, depending on the size of the building in which the installation is made, and in the present invention the casing parts or sections for corresponding portions of the casing are standard so far as proportions and design are concerned with the result that a casing of a length to accommodate any desired number of heating units, may be assembled, the assembly being facilitated by easily made connections or joints between adjacent casing portions or sections.

The bottom of a casing comprises a rectangular base frame 10 formed with end transverse members 11 and front longitudinal members 12. The various members 11 and 12 (see Figs. 4 and 5) are L-shaped with rear flanges 12' providing channels 13. For the front and rear, a suitable number of members 12 are secured together in endwise relation by joint strips 14 bolted thereto, and the transverse members 11 are secured to the ends of the members 12 by angularly disposed, bolted joint strips 15. The rear and ends of the casing are closed by vertically disposed outer sheets 16 and 16' whose lower edge portions are disposed within the channels 13 of the base frame. Said sheets 16 are formed along their side edges with inturned apertured flanges 17 and the flanges of adjacent rear sheets are in abutment and are covered and secured together by U-strips 18 and bolts 19 (see Fig. 6). The front of the casing is closed by front casing sheets 20 having their lower edge portions fitted into the base frame channel. Said front sheets are bolted together in the same manner as are the rear sheets and are provided with elongated openings covered by front plates 21 also having openings therein through which extension portions 22 and 23 of the units 8 project. Said front plates 21 are secured to the sheets and also to the projections 22 and 23 carried by the units 8. So far as the ends of the casing are concerned, the end sheets 16' are flanged along their side edges as at 24 (see Fig. 6) and are secured to adjacent flanged portions of the front and rear casing sheets by metal screws 25.

Lower door frames 26 are secured to the extensions 23 of the units 8 and provide access to the burner chamber openings of the units. Said door frames 26 also form hangings for the lower doors 27 and in addition provide hangings or support means for manifold and pilot lines 28 and 29 respectively which feed to burners within the lower portions of the units (not shown).

The built-up assembly of a casing top is shown in Fig. 3 and it will appear that the top comprises a plurality of pan-like members 30 with upturned flanges 31 at one side edge and rolled hooking flanges 32 at the other side edges. Members 30 are secured together by having adjacent flanges engaged and bolted together as shown. Also, the front and rear edge portions of the members 30 are flanged, and to secure the top to the casing, said flanges are engaged with upper edge portions of the sheets 16 and 20 and are bolted thereto. Flanges 31 and 32 are engaged with upper edge portions of end sheets 16' in a like manner and are bolted thereto.

The units 8 are supported in slightly elevated, spaced positions within the casing by removable front and rear legs 33 and 34 respectively. As previously mentioned, each pair of adjacent units 8 is separated within the assembled casing, by a thin flat vertical radiation shield or partition 9 formed of sheet metal. Said shields are positioned preferably equi-distant between adjacent units and extend from an elevation in accord with upper portions of the burner chambers of the units to the upper portions of the units. Each shield or partition 9 is held in its position within the casing by having its front and rear edge portions engaged in vertical channels 35 carried by the casing members 16 and 20.

As previously mentioned the lower door frames 26 may provide suitable support for a manifold 28 and a pilot line 29, where the installation is a gas furnace. The manifold 28 is made up of a plurality of manifold sections of similar lengths joined together by unions 36. The assembled manifold extends horizontally along the lower front portion of the casing and is mounted in recessed portions 37 formed therefor in the lower door frames 26. The pilot line 29 is positioned below the manifold and is formed of a plurality of similar sections joined by unions 38. Said pilot line is also mounted in recessed portions 39 formed therefor in the lower door frames 26. The manifold and pilot lines are jointly held in position by simple one-piece clamping brackets 40. Each bracket 40 is adjustably held in clamping position by a screw 40 extended through a medial portion of the bracket and into a frame portion.

While the improved heater casing has been shown and described in connection with multi-unit gas furnaces, it is obvious that the casing may be applied to any type of heating apparatus.

From the foregoing description it will be seen that the sectional construction and interchangeability of similarly positioned casing parts permits a casing to be assembled to any desired length for the accommodation of heating apparatus of any length or to enclose any number of heating units. The various joint connections between the casing sections are such that assembly of the casing may be accomplished very quickly and easily with a minimum of effort and thereby minimizing the assembly costs. The improved sectional casing for heating devices is furthermore of simple and novel construction and is well adapted for the purposes described.

What I claim as my invention is:

1. A sectional heater casing, comprising a sectional rectangular base frame, detachably secured together side and end wall sections having their lower edge portions detachably mounted in said base frame, and a sectional casing top formed of a plurality of identical top sections having flanged edge portions, said top sections being positioned in mutual alinement and adjacent flanged edges of the top section being engaged and detachably secured together, other flanged edges of the top sections being engaged with and detachably secured to upper portions of side and end wall sections.

2. A heater casing, comprising secured together vertical side and end wall sections, a top formed of a plurality of similar sections having flanged edge portions, said top sections being positioned in mutual alinement and adjacent flanged edges of the top sections being secured together, other flanged edges of the top sections being secured to upper portions of side and end wall sections, vertical channels secured to inner surfaces of said side wall sections, and a partition having opposite vertical edges engaged within opposite channels.

3. A sectional heater casing, comprising a base frame formed of a plurality of elongated rectilineal elements secured together in endwise relation to form a rectangular frame, each element comprising a pair of angled members secured together to form a channel therebetween, detachably secured together side and end wall sections having their lower edge portions detachably mounted in the channels of said base frame, and a sectional casing top formed of a plurality of identical top sections having flanged edge portions, said top sections being positioned in mutual alinement and adjacent flanged edges of the top section being engaged and detachably secured together, other flanged edges of the top sections being engaged with and detachably secured to upper portions of side and end wall sections.

4. A sectional heater casing, comprising a base frame formed of a plurality of elongated rectilineal elements secured together in endwise relation to form a rectangular frame, each element comprising a pair of angled members secured together to form a channel therebetween, detachably secured together side and end wall sections having their lower edge portions detachably mounted in the channels of said base frame, and a sectional casing top formed of a plurality of identical pan-like top members of rectangular form, one pair of opposite edges of a member being formed with downwardly opening channeled flanges, another edge of the member being formed with an upturned flange and the edge opposite said last-mentioned edge being formed with a downwardly opening hooking flange, the upturned flange of one member being engaged in the hooking flange of an adjacent member to connect the two members together in alinement, other flanged edges of the top sections being engaged with and detachably secured to upper portions of side and end wall sections.

5. A heater casing, comprising secured together vertical side and end wall sections, a sectional top having its peripheral portions engaged with upper edge portions of the side and end wall sections, vertical channels secured to inner surfaces of said side wall sections, and a partition having opposite vertical edges engaged within opposite channels.

6. In combination with a heating apparatus including at least two similar heating devices, adjoining casings for said heating devices, said adjoining casings entirely comprising casing sections detachably secured to those of the heating device there adjacent to provide a common sectional enclosure for both of said heating devices, said adjoining casings also including a base frame formed of a plurality of elongated rectilineal elements secured together in endwise relation, all correspondingly positioned casing sections being similar and being interchangeable.

EDWIN A. JONES.